Patented Aug. 3, 1943

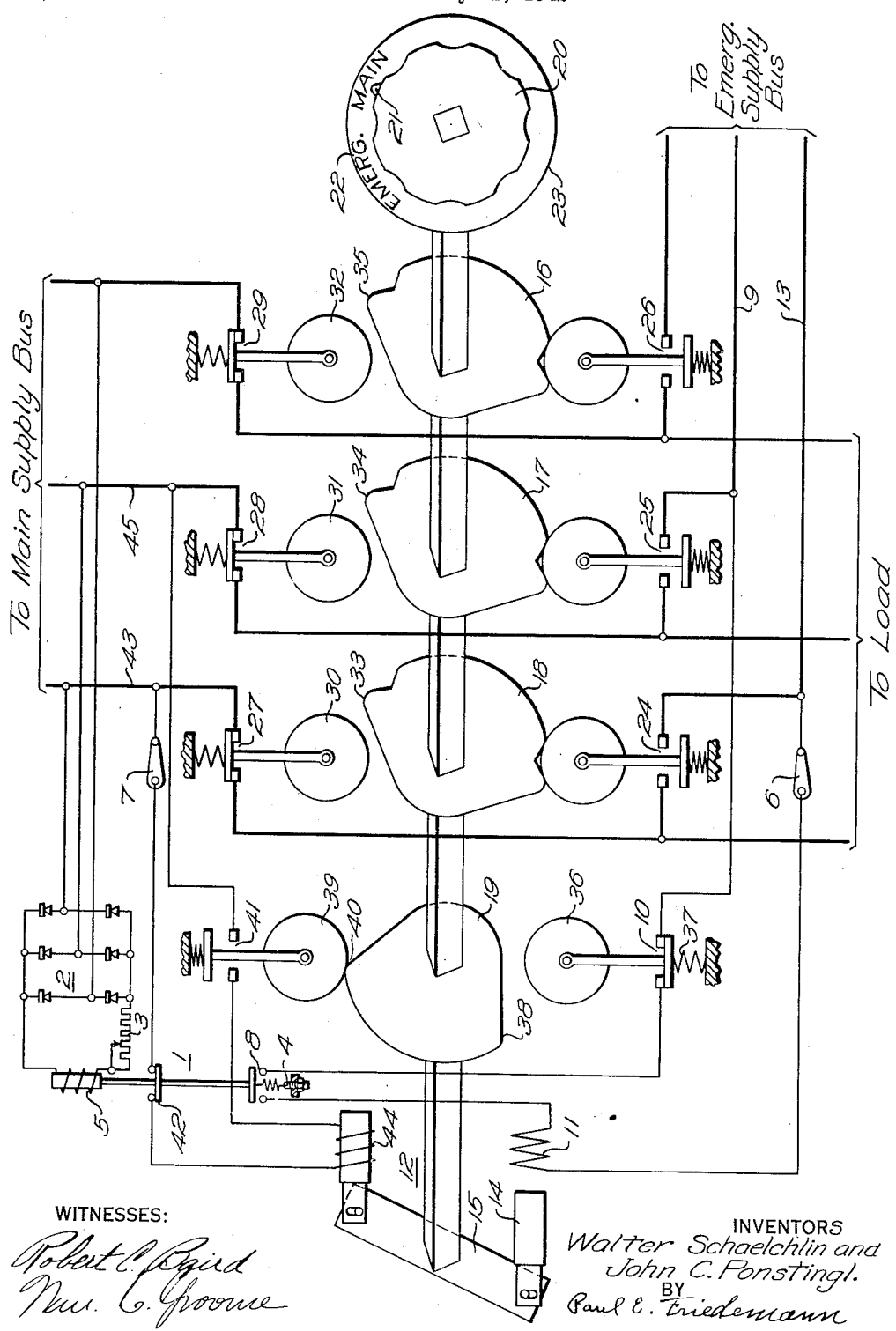

2,326,070

UNITED STATES PATENT OFFICE 2,326,070

AUTOMATIC BUS TRANSFER EQUIPMENT

Walter Schaelchlin, Forest Hills, Pa., and John C. Ponstingl, Cleveland, Ohio, assignors to Westinghouse Electric & Manufacturing Company, East Pittsburgh, Pa., a corporation of Pennsylvania Application May 21, 1942, Serial No. 443,936

4 Claims. (Cl. 171—97)

Our invention relates to bus transfer equipment and, more particularly, to automatically operable bus transfer equipment devised for special utility on board naval vessels and other similar fields of application.

On board naval vessels, and some other similar fields of application, it is extremely important that lighting equipment remain in operation regardless of bomb hits, shell hits, or gunfire of the guns on board ship. To this end, the lighting equipment, and some other electric load units, usually have at least two electric power sources, a main supply and an emergency supply. The arrangement, therefore, must be such that the two sources of power may be selectively connected to the lighting load. Further, the arrangement must be such that either source can be connected to the lighting load automatically or manually.

In the case of a three-phase alternating-current system, which is generally used, the switching equipment, commonly called a bus transfer, must be capable of detecting phase failures, a reduction in the bus voltage, and a complete failure of the main supply. If any one of these faults occurs on the main supply, the bus transfer equipment must be capable of automatically and expeditiously switching the load from the main power supply to the emergency power supply.

The two vital units of the bus transfer are the switches, or contactors, and the phase failure relay. If the phase failure relay is designed to detect the failure of one phase of the main supply, then a complete voltage failure of the main supply will obviously be detected also.

The bus transfer equipments of the prior art attempt to solve (and to some extent do) the mentioned problems by utilizing latched-in magnetic contactors and a relatively complicated and expensive phase failure relays. This arrangement is not satisfactory, first, because of the unreliability due to the involved interconnections and networks, and, second, because of the large size of the bus transfer equipment. Further, this rather unreliable type of bus transfer equipment is rather expensive.

Certain broad objects of our invention are to provide simple, inexpensive, and reliable bus transfer equipments.

An object of our invention is the provision of bus transfer equipment that maintains its useful function even when subjected to shocks.

Other objects of our invention will become more apparent from a study of the following specification and drawing, in which:

The single figure is a somewhat diagrammatic showing of our bus transfer equipment.

To illustrate our invention, the showings of the two electric energy generating units, requiring at least two separate generators and two separate prime movers for respectively operating these generators, have not been made because it is thought that the mere designation of the three groups of buses as Main supply bus, Load bus, and Emergency supply bus, respectively, suffices.

As part of our bus transfer equipment, we utilize a direct-current relay 1. This relay 1 is supplied with direct current from the three-phase rectifier 2. The drop-out value of this direct-current relay can be adjusted much more accurately and reliably than an alternating-current phase failure relay. The adjustment may be effected by a suitable design, or selection, of the magnetic circuit of the relay and also by suitable manipulation of the adjustable resistor 3 and by suitable manipulation of the spring tension adjusting means 4. Further, this direct-current relay is much cheaper than any of the relays used by the prior art.

By the adjustments mentioned, relay 1 can be caused to pull in and drop out by predetermined voltage changes of the main supply. If one of the phases on the main supply buses fails, the voltage across coil 5 drops approximately twenty percent. If the effect of coil 5 is adjusted properly, the relay armature will drop out at a twenty percent voltage reduction. This means that this relay will drop out on a failure of any one phase, a complete voltage failure, and when there is a twenty percent or greater reduction in the voltage on the main supply buses. This last advantageous operation is naturally obtained, because the rectified voltage on coil 5 will be proportional to the voltage on the three-phase alternating current of the main supply buses.

For the main switches for actually transferring the connection, we utilize cam actuated switches, wherein the cams are operated to one position or the other position by electromagnetic means. Provision is also made for effecting such transfer by manually operable means.

A better understanding of our invention can probably be had from a study of a typical sequence of operation. If both the main supply and the emergency supply are at normal voltage, and switches 6 and 7 are closed, all the parts will be in the position shown in the figure.

The load is thus supplied from the main supply. In the event there is on the main supply either a phase failure, a complete voltage failure, or a twenty percent or more voltage reduction, then coil 5 is no longer able to hold the relay armature up. The relay 1 drops out and contact members 8 are closed. A circuit is immediately established from bus 9, through the normally closed cam operable switch 10, contact members 8, coil 11 of the electromagnetic operator 12, through switch 6 to bus 13.

Upon energization of coil 11, the armature 14, through arm 15, rotates the cams 16, 17, 18 and 19 and the handwheel 20 in a counterclockwise direction. The angle through which the rotation is effected is determined by the electromagnetic device 12 and the structure and arrangement of the cams. When this operation takes place, the pointer 21, connected to the handwheel 20, will be moved to register with index 22 on the stationary base 23 on the panelboard (not shown). A mere inspection of the panelboard will thus reveal whether the main supply or the emergency supply is connected to the load.

As the cams rotate counterclockwise, the three switches 24, 25 and 26 will close substantially simultaneously that the three switches 27, 28 and 29 open. This means that now the load buses are supplied with energy from the emergency buses.

The instant rollers 30, 31 and 32 have just passed over the humps 33, 34 and 35. The force of these rollers, acting on cams 18, 17 and 16, respectively, is to aid in completing the counterclockwise rotation. At about the same instant, these rollers 30, 31 and 32 begin to aid the counterclockwise rotation, roller 36 is forced down against the spring 37, and switch 10 is opened, thereby deenergizing coil 11. Roller 36, when this operation is completed, will hold a position at region 38 on cam 19 corresponding to the position roller 39 is shown to hold at region 40 on cam 19.

It will be noted that when the transfer of the load to the emergency buses is completed, the electromagnetic device is again completely deenergized even though this transfer operation causes the closing of switch 41. This will be clear from the fact that contact members 42 of relay 1 are still open, these contact members having been opened when relay 1 dropped out.

As soon as the fault is removed from the main supply buses, coil 5 again becomes sufficiently energized to pick up relay 1. Contact members 8 thus open and contact members 42 close.

The closure of contact members 42 establishes a circuit from bus 43 through knife switch 7, contact members 42, coil 44 of electromagnetic device 12, switch 41 to bus 45. The electromagnetic device thus operates all the parts to the position shown. The sequence is now reversed, namely, first switch 10 opens, then switches 27 28 and 29 close at the same time switches 24, 25 and 26 open, and then switch 41 opens to again deenergize the electromagnetic device 12.

If the attendant tries to operate the transfer manually, while the system is capable of automatic transfer of the load say from the main supply to the emergency supply and again back to the main supply and while knife switches 6 and 7 are closed, he will effect a closure of switch 41 even before any of the other switches are operated. Coil 44 thus becomes energized. The magnetic device 12 thus immediately takes the control out of the hand of the attendant and either maintains or immediately reestablishes the circuits as shown.

This is a very useful feature on board war vessels. For instance, if, by reason of some shock, the cams are caused to rotate out of the position shown, then the electromagnetic device, immediately upon cessation of the first few main vibrations, recloses the circuits as shown.

If for any reason manual control is desired, switches 6 and 7 are opened. This eliminates the control effect of electromagnetic device 12.

From the foregoing, it will be apparent that we have provided a much simpler, cheaper and a more reliable bus transfer equipment than used by the prior art. Further, our equipment requires a control panel of only about one third the size of the panels used heretofore.

Our specific showing is merely illustrative, and the scope of our invention is naturally broader than the particular circuit arrangement and equipment disclosed. We, therefore, wish to be limited only by the scope of the claims hereto appended.

We claim as our invention:

1. In an electric control for transferring an electric load circuit from one source of supply to another source of supply, in combination, a three-phase main supply bus, a three-phase emergency supply bus, a three-phase load, three spring biased switches normally biased to closed position to connect the load to the main supply, three other spring biased switches normally biased to closed position, an electromagnetically operable cam controller having three cams normally in position to hold said second three switches open, a three-phase rectifier connected to the main supply bus, a relay, having a coil energized through said three-phase rectifier from the main supply and being responsive to dropout in the event of a phase failure, a voltage failure, or a decrease in main supply voltage of twenty percent or more, switching means operable by the dropout of said relay for energizing said electromagnetic means for operating the cam controller, whereby said load is disconnected from said main supply and connected to the emergency supply, and means operable by the controller immediately after the transfer operation for deenergizing said electromagnetic means.

2. In an electric bus transfer control for transferring an electric load circuit from one source of supply to another source of supply, in combination, main alternating-current supply buses, emergency alternating-current supply buses, an electrical load, rectifying means connected to said main alternating-current supply buses, a direct-current relay connected to be energized from the main source of supply by direct current through said rectifying means, said relay being so designed and adjusted that it will drop out in the event of the occurrence at the main supply of a phase failure, a complete voltage failure, or a drop in voltage of twenty percent or more, switching means having two operative positions, said switching means normally being in the position for connecting the load to the main buses, a cutout switch, electromagnetic means energized through said cutout switch by the dropout of said relay to operate said switching means to disconnect said load from the main buses and to connect said load to the emergency buses, means operated by said switching means, while being operated by said electromagnetic means, for opening said cutout switch to deenergize said electromagnetic means upon the completion of the transfer operation of said switching means.

3. In an electric bus transfer control for transferring an electric load circuit from one source of supply to another source of supply, in combination, main alternating-current supply buses, emergency alternating-current supply buses an electrical load, rectifying means connected to said main alternating-current supply buses, a direct-current relay connected to be energized from the main source of supply by direct current through said rectifying means, said relay being so designed and adjusted that it will drop out in the event of the occurrence at the main supply of a phase failure, a complete voltage failure, or a drop in voltage of twenty percent or more, switching means having two operative positions, said switching means normally being in the position for connecting the load to the main buses, electromagnetic means energized by the dropout of said relay to operate said switching means to disconnect said load from the main buses and to connect said load to the emergency buses.

4. In an electric bus transfer control for transferring an electric load circuit from one source of supply to another source of supply, in combination, main alternating-current supply buses, emergency alternating-current supply buses, an electrical load, rectifying means connected to said main alternating-current supply buses, a direct-current relay connected to be energized from the main source of supply by direct current through said rectifying means, said relay being so designed and adjusted that it will drop out in the event of the occurrence at the main supply of a phase failure, a complete voltage failure, or a drop in voltage of twenty percent or more, switching means having two operative positions, said switching means normally being in the position for connecting the load to the main buses, a cutout switch, electromagnetic means energized through said cutout switch by the dropout of said relay to operate said switching means to disconnect said load from the main buses and to connect said load to the emregency buses, means operated by said switching means, while being operated by said electromagnetic means, for opening said cutout switch to deenergize said electromagnetic means upon the completion of the transfer operation of said switching means, and electromagnetic means energized by the pickup of the relay upon restoration of normal electrical characteristics on the main buses to operate said switching means to transfer the load back to the main buses.

WALTER SCHAELCHLIN.
JOHN C. PONSTINGL.